(12) United States Patent
Tang et al.

(10) Patent No.: US 11,043,888 B2
(45) Date of Patent: Jun. 22, 2021

(54) VIBRATION MOTOR

(71) Applicant: AAC ACOUSTIC TECHNOLOGIES (SHENZHEN) CO., LTD., Shenzhen (CN)

(72) Inventors: Yun Tang, Shenzhen (CN); Lubin Mao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 7 days.

(21) Appl. No.: 16/526,981

(22) Filed: Jul. 30, 2019

(65) Prior Publication Data
US 2020/0044545 A1    Feb. 6, 2020

(30) Foreign Application Priority Data
Aug. 3, 2018 (CN) .......................... 201821255379.0

(51) Int. Cl.
*H02K 33/18* (2006.01)
*H02K 33/14* (2006.01)
*B06B 1/04* (2006.01)

(52) U.S. Cl.
CPC ............. *H02K 33/18* (2013.01); *H02K 33/14* (2013.01); *B06B 1/045* (2013.01)

(58) Field of Classification Search
CPC ........ H02K 33/14; H02K 33/02; H02K 35/00; H02K 33/00; H02K 33/10; B06B 1/045
(Continued)

(56) References Cited

U.S. PATENT DOCUMENTS 5,323,133 A * 6/1994 Heath ...................... G01V 1/18
335/222
10,468,956 B2 * 11/2019 Zhang .................... H02K 33/18
(Continued)

FOREIGN PATENT DOCUMENTS

CN    202353418 B1    7/2012
CN    204425166 B1    6/2015
(Continued)

OTHER PUBLICATIONS

1st Office Action dated Oct. 1, 2019 in related Japanese Patent Application 2019130112 (10 Pages).

*Primary Examiner* — Ahmed Elnakib
(74) *Attorney, Agent, or Firm* — W&G Law Group LLP

(57) ABSTRACT

Disclosed is a vibration motor including: a housing having an accommodating space, a first vibrator accommodated in the housing and having a coil, a first elastic component elastically supporting the first vibrator, and a circuit board electrically connected to outside. The first elastic component includes a first fixed portion, an elastic arm bending and extending from the first fixed portion, and a second fixed portion bending and extending from the elastic arm. The first elastic component includes substrate layers located on two sides and a damping layer sandwiched therebetween. A lead is disposed in the damping layer. The lead extends along the first elastic component and respectively extends out of the first and second fixed portion to form a first and second electrical conductive terminal. The first electrical conductive terminal is electrically connected to the circuit board. The second electrical conductive terminal is electrically connected to the coil.

12 Claims, 4 Drawing Sheets

(58) Field of Classification Search
USPC ................ 310/15, 17, 21, 23, 25, 26, 27, 28
See application file for complete search history.

(56) References Cited

U.S. PATENT DOCUMENTS

| | | | |
|---|---|---|---|
| 2011/0133577 A1* | 6/2011 | Lee ........................ | H02K 33/18 |
| | | | 310/15 |
| 2016/0181900 A1* | 6/2016 | Xu ......................... | H02K 33/02 |
| | | | 310/12.27 |
| 2016/0181902 A1* | 6/2016 | Xu ......................... | H02K 33/18 |
| | | | 310/17 |
| 2017/0012517 A1* | 1/2017 | Huang .................... | H02K 33/00 |
| 2020/0044545 A1* | 2/2020 | Tang ....................... | H02K 33/18 |
| 2020/0067393 A1* | 2/2020 | Ishikawa ................ | H02K 33/18 |

FOREIGN PATENT DOCUMENTS

| | | | |
|---|---|---|---|
| JP | 2017006901 A1 | 1/2017 | |
| JP | 2017018936 A1 | 1/2017 | |
| JP | 2017034963 A1 | 2/2017 | |

\* cited by examiner

VIBRATION MOTOR

TECHNICAL FIELD

The present disclosure relates to a vibration motor, and in particular, to a linear vibration motor with linear vibration.

BACKGROUND

With the development of electronics technologies, portable consumer electronic products such as mobile phones, handheld game consoles, navigation apparatuses or handheld multimedia entertainment devices become increasingly popular among people. Vibration motors are usually used to provide system feedbacks such as call alerts, message alerts, and navigation alerts of mobile phones and vibration feedbacks of game consoles. Such wide application requires that vibration motors have high performance and long service life.

A vibration motor usually includes a housing having an accommodating space, a vibrator accommodated in the accommodating space, and an elastic component respectively connected to the housing and the vibrator. The elastic component supports a reciprocal movement of the vibrator in the housing to generate vibration. In a vibration motor in the prior art, electrical connections in a circuit of the elastic component are unreliable and tend to fracture.

Therefore, a new vibration motor needs to be provided to resolve the foregoing problem.

DETAILED DESCRIPTION

The present disclosure is further described below with reference to the accompanying drawings.

Figure 1:
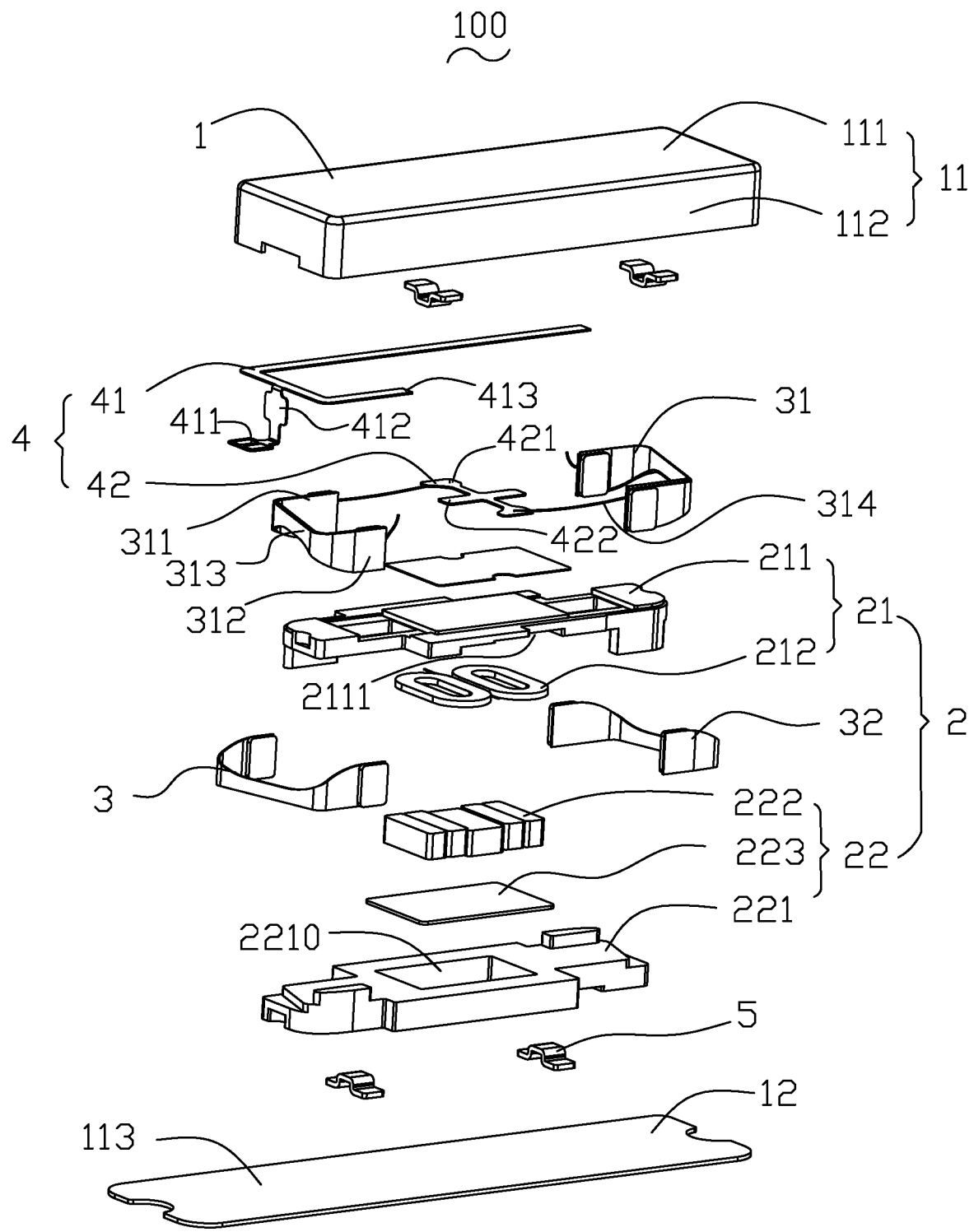
FIG. 1 is a schematic exploded structural view of a vibration motor according to the present disclosure.

As shown in FIG. 1, the present disclosure provides a vibration motor 100, including a housing having an accommodating space 1, a vibrator 2 accommodated in the housing 1, an elastic component 3 elastically supporting the vibrator 2, and an electrical connection component 4 electrically connected to outside.

The housing 1 includes a top wall 111, a bottom wall 113, and a side wall 112 connecting the top wall 111 and the bottom wall 113. Specifically, in this embodiment, the housing 1 includes a cover plate 11 and a bottom board 12 covering the cover plate 11 and forming the accommodating space with the cover plate 11. The top wall 111 and the side wall 112 are arranged at the cover plate 11, and the bottom wall 113 is arranged at the bottom board 12. Certainly, in another optional example, the housing 1 may have an integral structure. Alternatively, the side wall may be arranged at the bottom board 12, and the cover plate 11 has a panel structure. Both cases are implementable.

The vibrator 2 includes a first vibrator 21 and a second vibrator 22 moving relative to the first vibrator 21. A magnetic circuit is disposed at one of the first vibrator 21 and the second vibrator 22, and a coil corresponding to the magnetic circuit is disposed on the other of the first vibrator 21 and the second vibrator 22. When being energized, the coil interacts with the magnetic circuit to respectively generate driving forces with opposite directions in the first vibrator 21 and the second vibrator 22 to drive the first vibrator and the second vibrator to move relatively in parallel to the bottom board 12 along different trajectories. Certainly, this is only a preferred solution. In another optional example, the vibrator 2 may have another structure. Only one vibrator may be arranged and the second vibrator is not arranged, the magnetic steel may be fixed on the housing, and the coil may be fixed on the vibrator.

Specifically, in this embodiment, the first vibrator 21 includes a first mass block 211 and a coil 212 disposed on the first vibrator 21. A fixing groove 2111 configured to fix the coil 212 is disposed on the first mass block 211. The coil 212 is fixed in the fixing groove 2111. In this embodiment, two coils 212 are side by side in a same plane and are disposed in the fixing groove 2111 in parallel to each other.

The second vibrator 22 includes a second mass block 221, a magnetic circuit 222 fixed with the second mass block 221, and a magnetically conductive plate 223 affixed on the second mass block 221 and covering the magnetic circuit 222. The magnetically conductive plate 223 is configured to gather diverging magnetic induction lines, thereby improving magnetic induction intensity. A vertically penetrating through hole 2210 is provided in the second mass block 221, and the magnetic circuit 222 is disposed in the through hole 2210 of the second mass block 221. The magnetic circuit 222 in this embodiment includes five permanent magnets disposed side by side in the through hole. In another optional example, more through holes may be disposed, or only one permanent magnet may be disposed. Certainly, the quantity and structure of the permanent magnets is not limited thereto.

Figure 2:
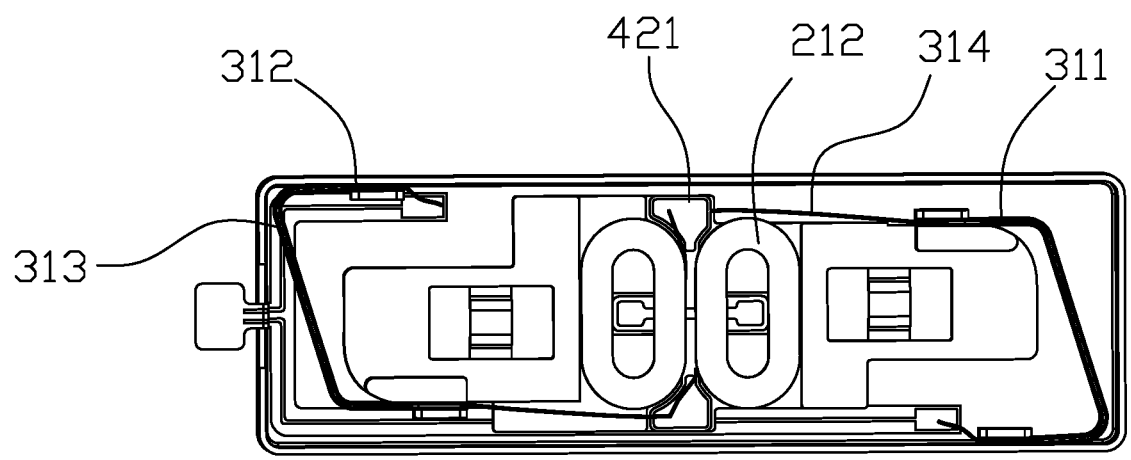
FIG. 2 is a schematic view of a partial assembled structure of a vibration motor according to the present disclosure.
Figure 3:
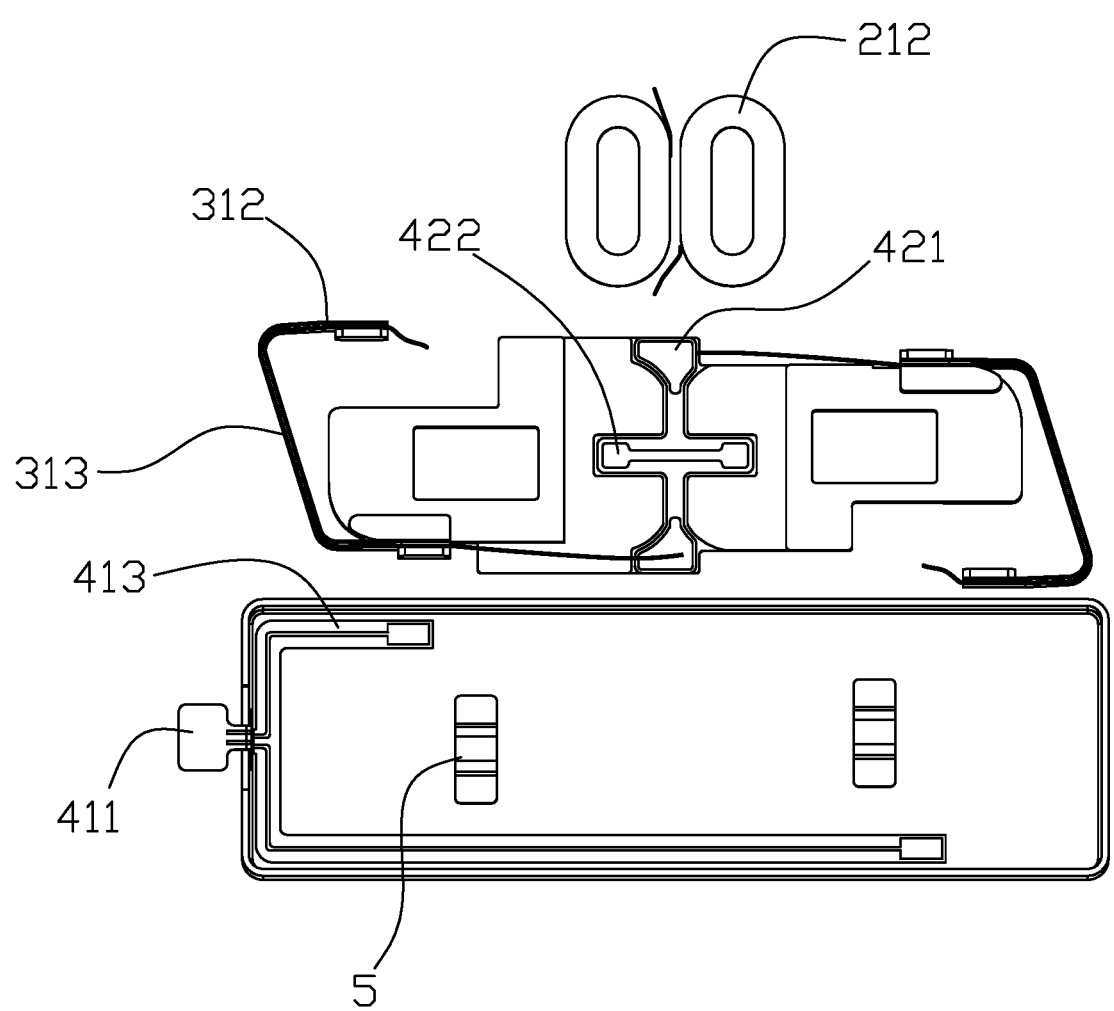
FIG. 3 is a schematic exploded view of the partial structure in FIG. 2.

As shown in FIG. 2 and FIG. 3, the elastic component 3 includes a first elastic component 31 configured to elastically support the first vibrator 21 and a second elastic component 32 configured to elastically support the second vibrator 22. There are at least two first elastic components 31 respectively disposed at two sides of the first vibrator 21 in a vibration direction, and there are at least two second elastic components 32 respectively disposed at two sides of the second vibrator 22 in a vibration direction. Specifically, in this embodiment, the first elastic component 31 and the second elastic component 32 are both a pair of C-shaped springs. One end of the C-shaped spring is fixed on the vibrator 2, and the other end of the C-shaped spring is fixed on the side wall 112 of the housing 1. The first elastic component 31 and the second elastic component 32 independently support the first vibrator 21 and the second vibrator 22.

The first elastic component 31 includes a first fixed portion 311 connected to the first mass block 211 of the first vibrator 21, a second fixed portion 312 connected to the side wall 112 of the housing 1, and an elastic arm 313 connecting the first fixed portion 311 and the second fixed portion 312. The elastic arm 313 bends and extends from edges of the first fixed portion 311 and the second fixed portion 312. Specifically, in this embodiment, the second elastic component 32 and the first elastic component 31 have the same structure. Certainly, in another optional example, the second elastic component 32 may have another structure different from that of the first elastic component 31, provided that the corresponding vibrator is supported and fixed.

The electrical connection component 4 includes a circuit board 41 disposed on the housing 1 and a wiring board 42 disposed on the first vibrator 21. Specifically, the circuit board 41 is affixed on the top wall 111 of the housing 1, the wiring board 42 is affixed to a groove bottom of the fixing groove 2111 of the first mass block 211, and the coil 212 is further disposed in the fixing groove 2111 and is attached and electrically connected to the wiring board 42.

Specifically, the circuit board 41 includes a main body portion attached to the top wall 111, an extending portion 412 bending and extending from the main body portion in a direction towards the bottom wall 113, and a first electrically conductive terminal 411 bending and extending from the extending portion 412. The extending portion 412 is affixed on the side wall 112, and the first electrically conductive terminal 411 is affixed on the bottom wall 113 and extends out of the housing 1, so as to be electrically connected to outside. The main body portion includes two second electrically conductive terminals 413 respectively located on two sides of the top wall 111. The second fixed portions 312 of two first elastic components 31 are respectively electrically connected to the second electrically conductive terminals 413. A notch is formed corresponding to the first electrically conductive terminal 411 in the side wall 112 of the housing 1, and the first electrically conductive terminal extends out of the housing 1 through the notch.

The wiring board 42 has a cross-shaped structure, and includes two third electrically conductive terminals 421 that are respectively electrically connected to the first fixed portion 311 and a fourth electrically conductive terminal 422 electrically connected to a voice coil 212. Each voice coil 212 has two lead-out voice coil wires. One of the voice coil wires is electrically connected to the fourth electrically conductive terminal 422, and the other voice coil wire is electrically connected to the third electrically conductive terminal 421.

Figure 4:
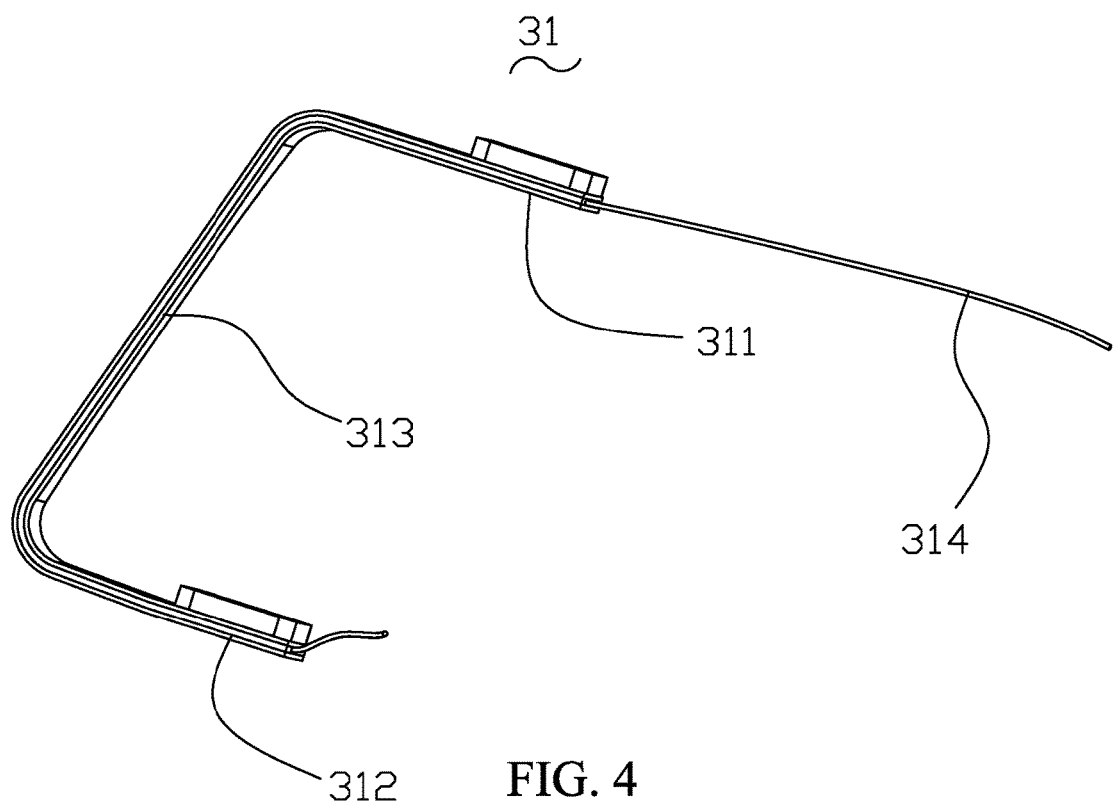
FIG. 4 is a schematic structural view of a first elastic component of a vibration motor according to the present disclosure.
Figure 5:
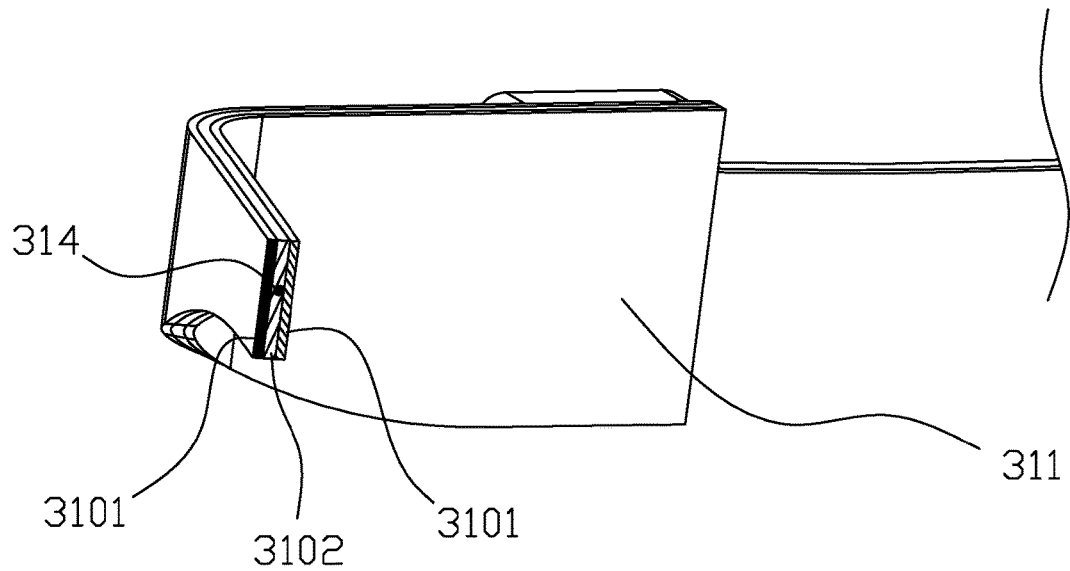
FIG. 5 is a sectional view of a first elastic component of a vibration motor according to the present disclosure.

As shown in FIG. 4 and FIG. 5, the first elastic component 31 includes substrate layers 3101 located on two sides and a damping layer 3102 sandwiched between the two substrate layers. A lead 314 is disposed in the damping layer 3102. The lead 314 extends out of the first fixed portion 311 and the second fixed portion 312 at two ends of the first elastic component 31 to form a first electrical connection terminal and a second electrical connection terminal. The first electrical connection terminal is electrically connected to the circuit board 41, and the second electrical connection terminal is electrically connected to the coil 212. Specifically, the first electrical connection terminal is electrically connected to the second electrically connection terminal 413 of the circuit board 41, and the second electrical connection terminal is electrically connected to the third electrically connection terminal 421 of the wiring board 42 and is electrically connected to the coil 212 via the third electrically conductive terminal 421, so as to implement overall electrical connections of the vibration motor. In this embodiment, the substrate layer 3101 is a metal spring plate, and the damping layer 3102 is a glue layer. Certainly, in another optional example, the substrate layer and the damping layer may be made of other materials.

Further, to prevent the vibrator 2 from vibrating with excessive amplitude, a protruding limiting portion 5 is further disposed on the housing 1. Specifically, in this embodiment, the limiting portion 5 configured to restrict the first vibrator 21 is disposed on the top wall 111, and a limiting portion configured to restrict the second vibrator 22 is also disposed on the bottom wall 113. In this way, the product may be more reliable.

It should be noted that the spring structure having the damping layer sandwiched between the substrate layers of the present disclosure is applicable to a vibrator structure in this embodiment and also applicable to another motor with a single vibrator structure where a coil is provided on a vibrator.

The vibration motor of the present disclosure includes the housing having the accommodating space, the first vibrator with a coil accommodated in the housing, the first elastic component elastically supporting the first vibrator, and the circuit board fixed on the housing and electrically connected to outside. The first elastic component includes the first fixed portion fixed on the first vibrator, the elastic arm bending and extending from the first fixed portion, and the second fixed portion bending and extending from the elastic arm. The second fixed portion is fixed with the housing. The first elastic component includes the substrate layers located on two sides and the damping layer sandwiched between the two substrate layers. The lead is disposed in the damping layer. The lead extends along the first elastic component and respectively extends out of the first fixed portion and the second fixed portion to form the first electrical connection terminal and the second electrical connection terminal. The first electrical connection terminal is electrically connected to the circuit board. The second electrical connection terminal is electrically connected to the coil. In the present disclosure, the lead is disposed in the damping layer of the first elastic component, so that a wiring problem of a motor with double vibrators is effectively resolved, thereby providing better vibration sensation by disposing the double vibrators and making the circuit more reliable.

Although the embodiments of the present disclosure are shown and described above, it may be understood that the foregoing embodiments are exemplary and should not be construed as a limitation to the present disclosure. A person of ordinary skill in the art may make changes, modifications, replacements, and variations to the foregoing embodiments within the scope of the present disclosure.

What is claimed is:
1. A vibration motor, comprising:
   a housing having an accommodating space,
   a first vibrator accommodated in the housing and having a coil,
   a first elastic component elastically supporting the first vibrator, and
   a circuit board fixed on the housing and electrically connected to outside;
   wherein the first elastic component comprises:
      a first fixed portion fixed on the first vibrator,
      an elastic arm bending and extending from the first fixed portion, and
      a second fixed portion bending and extending from the elastic arm, the second fixed portion is fixed with the housing;
   wherein the first elastic component comprises:
      two substrate layers, and
      a damping layer sandwiched between the two substrate layers;
      wherein a lead is disposed in the damping layer; the lead extends along the first elastic component and respectively extends out of the first fixed portion and the second fixed portion to form a first electrical connection terminal and a second electrical connection terminal; the first electrical connection terminal is electrically connected to the circuit board, and the second electrical connection terminal is electrically connected to the coil.

2. The vibration motor according to claim 1, wherein the vibration motor further comprises:
   a second vibrator moving relative to the first vibrator, and
   a second elastic component elastically supporting the second vibrator;
   wherein a magnetic circuit corresponding to the coil is disposed the second vibrator; the coil is used to interact with the magnetic circuit to generate a driving force to drive the first vibrator and the second vibrator to move relatively.

3. The vibration motor according to claim 1, wherein the substrate layer is a metal spring plate.

4. The vibration motor according to claim 3, wherein the damping layer is a glue layer.

5. The vibration motor according to claim 2, wherein the first vibrator comprises:
   a first mass block,
   the coil fixed on the first mass block, and
   a wiring board electrically connected to the coil;
   wherein the second electrical connection terminal is electrically connected to the wiring board and is electrically connected to the coil via the wiring board.

6. The vibration motor according to claim 5, wherein the housing comprises:
   a top wall,
   a bottom wall disposed opposite and spaced from the top wall, and
   a side wall connecting the top wall and the bottom wall;
   wherein the circuit board is a flexible circuit board, and comprises:
   a main body portion attached to the top wall,
   an extending portion bending and extending from the main body portion in a direction towards the bottom wall, and
   a first electrically conductive terminal bending and extending from the extending portion;
   wherein a notch is formed corresponding to the first electrically conductive terminal in the housing, and the first electrically conductive terminal extends out of the housing through the notch.

7. The vibration motor according to claim 6, wherein the extending portion is attached to the side wall, and the first electrically conductive terminal is affixed on the bottom wall and extends out of the housing.

8. The vibration motor according to claim 7, wherein
   the main body portion comprises two second electrically conductive terminals respectively located on two sides of the top wall;
   at least two first elastic components are respectively disposed on two sides of the first vibrator in a vibration direction; and
   the second fixed portion of the first elastic component is respectively electrically connected to the second electrically conductive terminals.

9. The vibration motor according to claim 5, wherein the second vibrator comprises a second mass block, a vertically penetrating through hole is provided in the second mass block, the magnetic circuit comprises at least one permanent magnet disposed in the through hole, and the permanent magnet is disposed corresponding to the coil.

10. The vibration motor according to claim 9, wherein a fixing groove concave in a direction away from a second mass block is provided in the first mass block, the coil is fixed in the fixing groove, and the wiring board is disposed in the fixing groove and is attached to the coil.

11. The vibration motor according to claim 2, wherein the substrate layer is a metal spring plate.

12. The vibration motor according to claim 11, wherein the damping layer is a glue layer.

\* \* \* \* \*